United States Patent [19]

Thomann

[11] Patent Number: 4,638,169
[45] Date of Patent: Jan. 20, 1987

[54] MEASURING DEVICE FOR MEASURING THE CROSS-SECTION OF TEXTILE YARNS

[75] Inventor: Christof Thomann, Maur, Switzerland

[73] Assignee: Zellweger Uster, Ltd., Uster, Switzerland

[21] Appl. No.: 654,460

[22] Filed: Sep. 26, 1984

[30] Foreign Application Priority Data

Oct. 4, 1983 [CH] Switzerland .................. 5392/83

[51] Int. Cl.[4] .................. G01B 11/02; G01B 11/08
[52] U.S. Cl. .................. 250/560; 250/227; 356/387
[58] Field of Search .................. 250/227, 560, 561; 356/384, 385, 386, 387, 376; 350/96.28

[56] References Cited

U.S. PATENT DOCUMENTS

| 3,221,171 | 11/1965 | Locher | 250/560 |
| 3,248,554 | 4/1966 | Chen | 250/227 |
| 3,619,626 | 11/1971 | Rudolph | 356/387 |
| 4,037,968 | 7/1977 | King et al. | 356/386 |

Primary Examiner—David C. Nelms
Assistant Examiner—Stephone B. Allen
Attorney, Agent, or Firm—Antonelli, Terry & Wands

[57] ABSTRACT

Optical measuring devices for textile yarns require a homogeneous measuring field in order not to interpret changes in position of the yarn as additional changes in the cross-section or diameter. To form a homogeneous measuring field, it is proposed to insert in each case one light guide between the light source and the measuring field or between the measuring field and the light receiver, the purpose of the said light guide being to achieve a homogeneous light distribution in a measuring field intercepted by the yarn by means of internal reflection of the light passing therethrough. Such light guides can be made of transparent plastic and have the advantageous property that they can be curved, folded or twisted without the light guided by them escaping through the surface. By polishing or mirror-coating the surface of the light guides, the dispersion can be further reduced. The length of the light guides is also decisive as regards the degree of homogenization of the light flux in the measuring field; that is, the longer the guide, the more homogeneous the emerging light flux. Optical measuring devices of the said type can be used as sensors for at least approximate cross-section measurements in yarn scouring.

12 Claims, 4 Drawing Figures

MEASURING DEVICE FOR MEASURING THE CROSS-SECTION OF TEXTILE YARNS

FIELD OF THE INVENTION

The present invention relates in general to devices for use in the textile industry, and more particularly, to a device for measuring the cross-section of textile yarns.

BACKGROUND OF THE INVENTION

The cross-section or diameter of textile products, such as yarns and the like must be monitored at all stages of production. Because of the large number of measuring points, this demands measuring devices having the greatest possible simplicity and economic value, but nevertheless offering reliability and durability.

Optical measuring devices which have proven successful are, inter alia, those in which the yarn is irradiated from at least one side by a light source and, on the opposite side, a light receiver converts the size of the shadow produced by the yarn (i.e. the residual light incident outside the shade) into an electrical signal.

An essential prerequisite for a usable cross-section determination is that the measuring field of light intercepted by the yarn is as homogeneous as possible, consists of light of uniform intensity at all points of the measuring field, because it cannot be avoided that the position of the yarn varies within the measuring field during successive measurements. It is therefore not permissible for the measuring field to have different values within its region of influence as this would falsify the measured values.

Different measures for homogenizing the measuring field of optical measuring devices have already been disclosed, but these did not achieve the required objective. Thus, for example, it has been proposed as disclosed in German Offenlegungsschrift 2,310,204, to place in each case at least one optical fiber between the light source or light receiver and the yarn, the ends of the fiber(s) which are facing the yarn being opposite one another in axial alignment. However, this did not make it possible to achieve an adequate homogeneity.

SUMMARY OF THE INVENTION

The present invention avoids these disadvantages and relates to an optical measuring instrument for measuring the cross-section of textile yarns by the formation of a band of light of homogeneous luminance within a distance forming an optical measuring field.

The invention also includes an application of the optical measuring instrument as a sensor for at least approximate cross-section measurements.

The measuring instrument according to the invention is based on the observation that, in a suitably constructed transparent, homogeneous, optical light guide in the form of a band of preferably rectangular cross-section, the length of which is greater than the greater side length of the cross-section, the light applied to one end of the light guide from a light transmitter is homogenized by internal reflections in such a way that a uniform luminance results over the whole area of the light exit surface at the other end of the light guide.

To prevent light losses and provide for a homogenizing of the light, it is preferable not only to choose a plastic of high transparency, for example acrylic resin, as the material for the light guides, but also to treat its surface by polishing and, if appropriate, mirror coating, in such a way that, if possible, no light escapes the guide except at the exit end. Under these conditions, the light guide can be curved, folded or twisted, as required by the local mounting arrangements, without losing transparency.

In order to achieve an efficient passage of the light flux both on the light transmitter side and on the light receiver side, the front face of the light guide can be adapted to fit any curved, for example spherical, faces.

It is also possible to insert connecting pieces consisting of optical layers between the light transmitter and the light guide and/or between the light guide and the light receiver, if the mounting arrangements suggest such measures.

The optical measuring instrument according to the invention can also be constructed in such a way that only one light guide is used, for example the one between the light transmitter and the measuring field, while the light receiver receives the incident light directly without a light guide.

DETAILED DESCRIPTION OF THE PREFERRED EMBODIMENT

Figure 1:
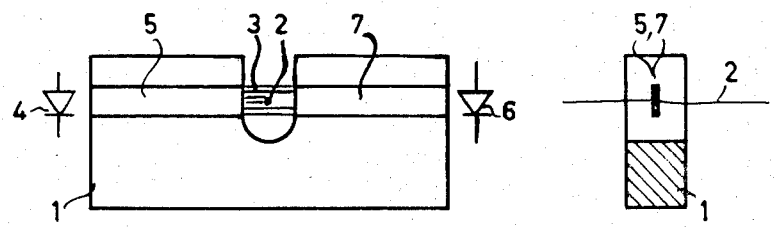
FIG. 1 shows a measuring instrument with stretched light guides.

FIG. 1 shows a housing 1 with a measuring slit through which the yarn 2 runs. Inserted in this housing 1 are the light guides 5, 7, the front faces of which are directed, on the one hand, towards the light transmitter 4 or towards the light receiver 6, and on the other hand, towards the measuring slit. The measuring field 3 is formed by the beam of rays emerging from the light guide 5 and entering the light guide 7.

The light guides 5, 7 should not be confused with a conventional optical fiber whose size is considerably smaller and whose sole purpose is the transmission of light without regard to the provision of a uniform illumination over a substantial area. The objective of the present invention is to provide a means for homogenizing the light transmitted from a light source for illuminating a measuring field of predetermined size so that a shadow of uniform size will be obtained from a yarn within the measuring field regardless of its position in that measuring field. For this purpose, the light guides 5, 7 are preferably made of a transparent plastic material, such as an acrylic resin, the side surfaces of which are polished and preferably have a mirror coating.

The dimensions of the light guides 5, 7 are also important to the object of the present invention. In this regard, the cross-sectional size preferably corresponds to the size of the measuring field, and the cross-sectional shape thereof may be rectangular to conform to a rectangular measuring field. The length of each light guide should be larger than the largest cross-section dimension to ensure that the light will be sufficiently homogenized by internal reflection.

Figure 2:
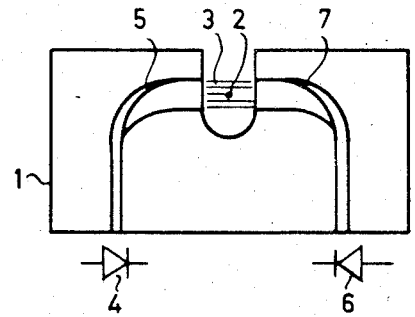
FIG. 2 shows a measuring instrument with curved light guides.

According to the variant in FIG. 2, the light guides 5, 7 are curved or twisted. This is permissible because the light guides 5, 7 internally reflect the light fed into them and also do not radiate outwards in the case of surface curvatures.

Figure 3:
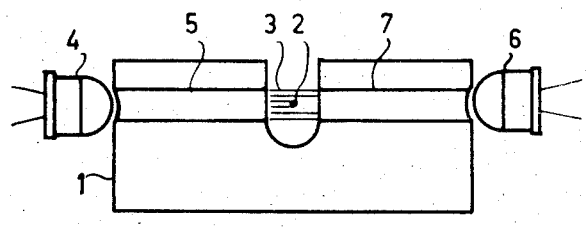
FIG. 3 shows a measuring instrument with light guides adapted in a concave fashion.

FIG. 3 shows that the front face of the light guides 5, 7 which is directed towards the light transmitter 4 or the light receiver 6 is adapted to any curvatures of the particular surface for better utilization of the light flux.

Figure 4:
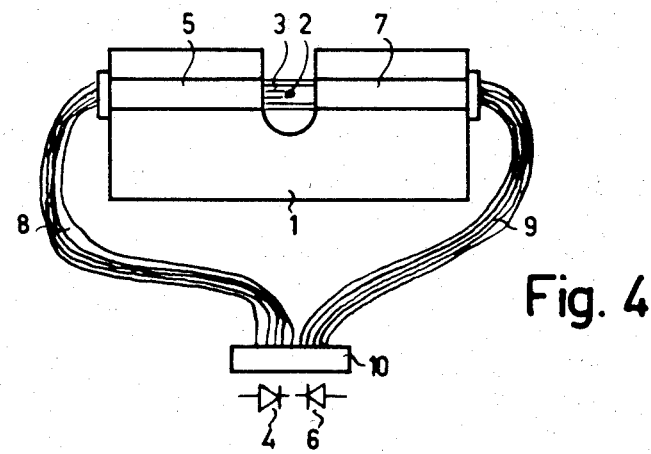
FIG. 4 shows a measuring instrument with additional optical fibers.

Finally, FIG. 4 indicates the possibility of inserting a bundle of optical fibers 8, 9 in each case between the light source 4 and the light guide 5 or between the light receiver 6 and the light guide 7. The optical fibers are fastened in a holder 10 on the side facing away from the housing 1, where they are opposite the light transmitter 4 or the light receiver 6. Thus, although the optical fibers themselves will not provide a uniform light output, the light guides 5 or 7 will produce the desired homogenization of the light for accurate measurement even in the event of positional movement of the yarn in the measuring field.

I claim:

1. A device for measuring the cross-section of textile yarns, comprising:
    a light source including means for projecting a band of light through a measuring field in which the textile yarn whose cross-section is to be measured may be disposed so as to intercept said band of light;
    means disposed between said light source and said measuring field for homogenizing said band of light prior to its passage through said measuring field so that the shadow produced by said yarn as it intercepts said band of light does not change in size with a change of position of the yarn, including a first light guide having reflecting surfaces which subject light passing through the light guide to multiple reflections and having an elongated shape with a length greater than the longest dimension of its cross-section;
    light receiver means for detecting the light passing through said measuring field from said light source and for generating a signal indicative of the cross-section of said yarn; and
    a second light guide disposed between said measuring field and said light receiver means to conduct said light from said measuring field to said light receiver means.

2. A device according to claim 1, wherein the outer surface of at least said first light guide is polished and has a mirror coating thereon.

3. A device according to claim 1, wherein at least said first light guide is made of a transparent plastic material.

4. A device according to claim 3, wherein said first light guide is made of an acrylic resin.

5. A device according to claim 1, wherein at least said first light guide consists of a single element having a rectangular cross-section and a length greater than the longest dimension of said rectangular cross-section.

6. A device according to claim 1, wherein at least said first light guide consists of a single element having a length greater than the largest dimension of its cross-section.

7. A device according to claim 6, wherein the area of the cross-section of at least said first light guide approximately corresponds to the size of said measuring field.

8. A device according to claim 1, wherein at least one of said first and second light guides is non-linear.

9. A device according to claim 1, wherein at least one of said first and second light guides has a non-circular cross-section.

10. A device according to claim 1, wherein said light guide has an end surface facing said light source which is non-planar.

11. A device according to claim 10, wherein said end surface of said first light guide has a concave curvature.

12. A device according to claim 1, further including a connecting piece consisting of optical fibers interposed between said light source and said first light guide to guide said band of light from said light source to said first light guide.

* * * * *